G. A. TEEL.
TRAP.
APPLICATION FILED MAR. 4, 1911.
1,015,916.
Patented Jan. 30, 1912.
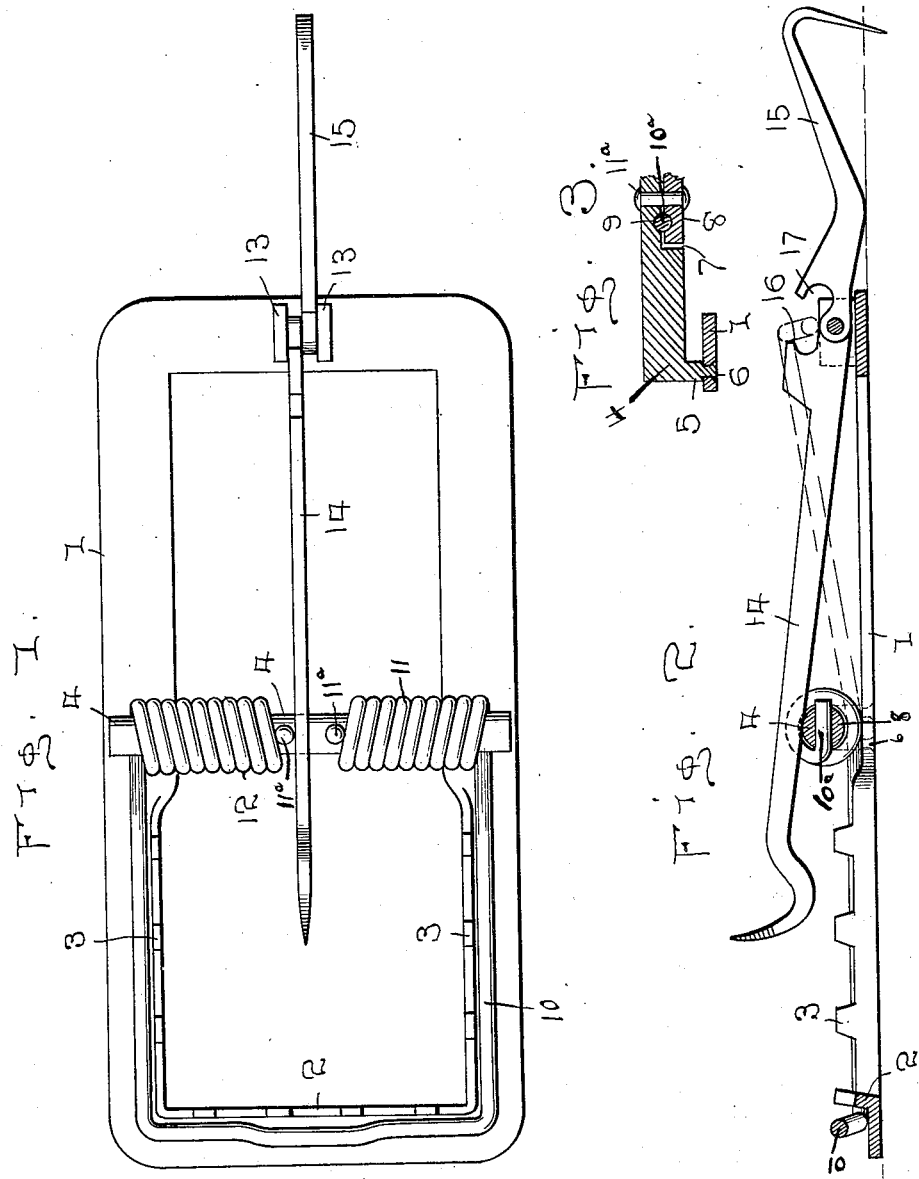
WITNESSES:
INVENTOR
G. A. Teel.
BY
W. J. Fitzgerald & Co.
Attorneys

UNITED STATES PATENT OFFICE.

GEORGE A. TEEL, OF ANACORTES, WASHINGTON.

TRAP.

1,015,916.   Specification of Letters Patent.   Patented Jan. 30, 1912.

Application filed March 4, 1911. Serial No. 612,195.

*To all whom it may concern:*

Be it known that I, GEORGE A. TEEL, a citizen of the United States, residing at Anacortes, in the county of Skagit and State of Washington, have invented certain new and useful Improvements in Traps; and I do hereby declare the following to be a full, clear, and exact description of the invention, such as will enable others skilled in the art to which it appertains to make and use the same.

My invention relates to new and useful improvements in traps and the object of my invention is to provide a trap which may be made in different sizes adapted to catch animals of different size.

Other objects and advantages of my invention will be hereinafter made clearly apparent and specifically pointed out in the claim.

In the accompanying drawing, I have shown the preferred form which my invention may take.

In said drawing, Figure 1 is a top plan view showing my improved trap. Fig. 2 is a longitudinal sectional view through the trap, and, Fig. 3 is a detail sectional view through a portion of the trap.

Referring to the drawings in which similar reference numerals designate corresponding parts throughout the several views, 1 is the frame of my trap which is preferably formed in rectangular shape. The frame is preferably stamped or otherwise formed from a sheet of metal. The inner edge of substantially one-half of the frame is upturned, as shown at 2, and the upturned portion is cut-away at intervals to form teeth 3.

Extending transversely of the frame and at substantially the central point thereof is a cross bar 4, the ends of which are preferably formed with extensions 5. The ends of the extensions 5 are adapted to take through apertures 6 formed in the frame and said ends are then swaged in said apertures so that the cross bar will be held rigidly in place. The cross bar 4 has a cut-away portion 7, and a plate 8 is adapted to fit in said cut-away portion.

Channels 9 are formed between the cut-away portion 7 of the frame and the plate 8, and the ends 10ª of a spring 10 are adapted to extend into said channels. The plate 8 is adapted to be secured in place in the cut-away portion 7 in any desired manner, but is preferably riveted to said bar, as shown at 11ª, in Fig. 3. The spring member 10 has spiral portions 11 and 12 formed upon the cross bar 4, the central portion of the spring member being formed in a loop which extends adjacent the upturned portion 2 of the frame and on the outer edge thereof, for a purpose to be hereinafter more clearly set forth.

At the opposite end of the frame from the upturned portion, I provide a pair of upwardly extending members 13, between which are pivoted the trigger 14 of my trap and a safety catch 15. The trigger extends substantially three-fourths the length of the trap, the end of said trigger being preferably formed with an upturned pointed end, to which may be secured any suitable bait. The trigger is formed adjacent its pivotal point with a notch 16. The safety catch 15 is also provided with a notch 17 adjacent its pivotal point, said notch 17 being formed in said safety catch at a slightly greater distance from the pivotal point than the notch 16, for a purpose to be hereinafter more clearly set forth.

When not in use, the parts of the trap assume the positions shown in Fig. 1. When it is desired to use the trap, the loop of the spring 10 is moved against the tension of the spring to the opposite end of the trap and the safety catch raised until the notch 17 therein moves above the loop portion of the spring 10 and prevents the return of the same to its previous position. The trigger 14 of the trap which has been previously baited, is then elevated preferably by a finger of the operator inserted from beneath the trap, until the notch 16 thereof extends over the looped end of the spring member 10. Owing to the fact that the notch 17 in the safety catch is formed at a slightly greater distance from the pivotal point than the notch 16, said safety catch will be disengaged from the loop of the spring member and will return to initial position. The trap is now in condition for use and may be located in any desired position. When the bait is touched by any animal, the trigger 14 will be slightly lowered and the looped end of the spring member will be disengaged from the notch 16, whereupon said looped end will be immediately returned to its initial position by the coil portions 11 and 12 of the spring member. The animal will be caught between the loop portion of the spring and the upturned portion 2 of the frame. By providing the upturned portion and cutting the same away at intervals to form the teeth 3, it will be much more difficult for an animal to escape from the trap than if the frame were perfectly plain. Should it be desired to secure a trap in position to prevent the same from being dragged away or to hang the same in some elevated position, a chain or other device may be secured in a suitable aperture formed in the frame 1. The end of the safety catch 15 is bent downwardly and sharpened and may be used, when desired, to secure the trap in an elevated position. When so used, the end of the safety catch is driven into the wood adjacent the trap.

I desire it to be understood that I may form my trap of different sizes so as to catch animals of different sizes. In the smaller sizes of trap, I desire it to be understood that the frame may be formed of any desired form and material, such as wire.

It will be seen that my trap may be formed entirely of metal and that the parts thereof may be readily secured together. It will also be seen that should any part of the trap become broken, it would be very easy to replace the same. It will also be seen that the trap may be baited and set without danger to the operator, as the safety catch may be held over the loop portion until the operator's hand used to set the trigger, is out of the way.

What I claim is:—

In a trap, the combination with a frame, a cross bar extending transversely of said frame and having end extensions secured within said frame, said cross bar having a cut away portion, a plate adapted to be secured in said cut away portion, a looped spring member mounted on said cross bar and having its ends secured between said cross bar and plate, the inner edge of the end of said frame being upturned, and teeth formed in said upturned edge; of a trigger pivotally mounted at the opposite end of said frame and extending substantially the length thereof, a safety catch pivoted to said frame adjacent to said trigger and extending beyond said frame, said safety catch having its end bent downwardly and pointed, said trigger and safety catch having oppositely arranged notches formed therein, said trigger being adapted to be raised to engage the looped spring member.

In testimony whereof I have signed my name to this specification in the presence of two subscribing witnesses.

GEORGE A. TEEL.

Witnesses:
N. B. HUNTLEY,
THOS. HUNTLEY.

Copies of this patent may be obtained for five cents each, by addressing the "Commissioner of Patents, Washington, D. C."